United States Patent
Yeke Yazdandoost et al.

(10) Patent No.: US 11,600,103 B2
(45) Date of Patent: *Mar. 7, 2023

(54) SHORTWAVE INFRARED OPTICAL IMAGING THROUGH AN ELECTRONIC DEVICE DISPLAY

(71) Applicant: Apple Inc., Cupertino, CA (US)

(72) Inventors: Mohammad Yeke Yazdandoost, Santa Clara, CA (US); Giovanni Gozzini, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,799

(22) Filed: Mar. 7, 2022

(65) Prior Publication Data
US 2022/0198820 A1 Jun. 23, 2022

Related U.S. Application Data

(63) Continuation of application No. 17/031,466, filed on Sep. 24, 2020, now Pat. No. 11,270,096, which is a continuation of application No. 16/143,390, filed on Sep. 26, 2018, now Pat. No. 10,824,837.

(51) Int. Cl.
*G06F 3/042* (2006.01)
*G06V 40/13* (2022.01)
*G06F 3/03* (2006.01)
*G06V 10/145* (2022.01)

(52) U.S. Cl.
CPC ........ *G06V 40/1318* (2022.01); *G06F 3/0304* (2013.01); *G06F 3/0321* (2013.01); *G06F 3/0421* (2013.01); *G06V 10/145* (2022.01)

(58) Field of Classification Search
CPC .... G06F 3/0304; G06F 3/0321; G06F 3/0412; G06F 3/0414; G06F 3/0416; G06F 3/0421; G06F 3/042; G06F 3/044; G06V 10/145; G06V 10/143; G06V 40/1318
See application file for complete search history.

(56) References Cited

U.S. PATENT DOCUMENTS

| | | |
|---|---|---|
| 9,218,811 B2 | 12/2015 | Alameh |
| 9,431,015 B2 | 8/2016 | Alameh |
| 9,530,381 B1 | 12/2016 | Bozarth |
| 9,589,170 B2 | 3/2017 | Ling |
| 9,600,741 B1 * | 3/2017 | Su .............................. G06T 5/50 |
| 9,632,344 B2 * | 4/2017 | Ludwig ............... H01L 27/3232 |
| 9,819,849 B1 | 11/2017 | Rivard |
| 10,083,335 B2 * | 9/2018 | Zhang ..................... G02B 6/005 |
| 10,181,070 B2 * | 1/2019 | Smith ................ G06V 40/1318 |
| 10,452,937 B2 | 10/2019 | Jin et al. |
| 10,469,714 B2 | 11/2019 | Rivard et ak, |
| 10,579,847 B2 | 3/2020 | Cho et al. |
| 10,725,595 B2 | 7/2020 | Schooley |
| 10,824,837 B2 | 11/2020 | Yazdandoost et al. |
| 11,270,096 B2 | 3/2022 | Yazdandoost et al. |
| 2020/0319734 A1 | 10/2020 | Schooley |

\* cited by examiner

*Primary Examiner* — Vijay Shankar
(74) *Attorney, Agent, or Firm* — Brownstein Hyatt Farber Schreck, LLP

(57) ABSTRACT

Systems and methods for through-display imaging. An optical imaging sensor is positioned at least partially behind a display and is configured to emit shortwave infrared light at least partially through the display to illuminate an object, such as a fingerprint, in contact with an outer surface of the display. Surface reflections from the object are received and an image of the object can be assembled.

20 Claims, 8 Drawing Sheets

SHORTWAVE INFRARED OPTICAL IMAGING THROUGH AN ELECTRONIC DEVICE DISPLAY

CROSS-REFERENCE TO RELATED APPLICATION

This application is a continuation of U.S. patent application Ser. No. 17/031,466, filed Sep. 24, 2020, which is a continuation of U.S. patent application Ser. No. 16/143,390, filed Sep. 26, 2018, now U.S. Pat. No. 10,824,837, the contents of which are incorporated herein by reference as if fully disclosed herein.

FIELD

Embodiments described herein relate to electronic device displays and, in particular, to display stack constructions facilitating through-display shortwave infrared biometric imaging.

BACKGROUND

An electronic device display (a "display") is typically formed from a stack of functional and structural layers (a "display stack") that is attached to, or otherwise disposed below, a protective cover. In many conventional implementations, the protective cover defines an exterior surface of a housing of the electronic device that incorporates the display. For increased contrast, a conventional display stack is intentionally designed to be opaque.

An electronic device can also include an optical imaging system, such as a camera or an ambient light sensor. Typically, an optical imaging system is positioned below the protective cover, adjacent to, and separated from, the display stack. As a result, a conventional electronic device incorporating both a display stack and an optical imaging system typically requires a large-area protective cover that extends beyond a periphery of the display stack in order to reserve space to accommodate the optical imaging system. This conventional construction undesirably increases the apparent size of a bezel region circumscribing the display, while also undesirably increasing the size and volume of the housing of the electronic device.

SUMMARY

Some embodiments described reference an electronic device including a protective outer cover. The protective outer cover defines an interface surface to receive a touch input from a finger. The device also includes a display positioned below the protective outer cover and an optical imaging system positioned below the display. The optical imaging system includes a light emitting element configured to emit shortwave infrared light through the display and a photosensitive element optically isolated from the light emitting element and configured to receive (through the display) a reflection from the interface surface corresponding to a portion of an image of the finger.

Some embodiments described herein reference a method of operating an optical imaging system positioned below a display of an electronic device to capture an image, the method including the operations of: detecting a contact area of a touch input provided to the display by the display; illuminating the contact area with shortwave infrared light by a light emitting element of the optical imaging system; receiving one or more surface reflections of shortwave infrared light from the contact area; and assembling an image from the one or more surface reflections.

Some embodiments described herein reference a method of imaging an input surface defined by a glass substrate, the method including the operations of: illuminating the input surface with shortwave infrared light emitted from one or more light emitting elements; receiving, at an array of photosensitive elements, one or more surface shortwave infrared light reflections from the input surface at an array of photosensitive elements after filtering the one or more surface shortwave infrared light reflections with a narrow field of view filter; and assembling an image of the input surface based on the received one or more surface shortwave infrared light reflections.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
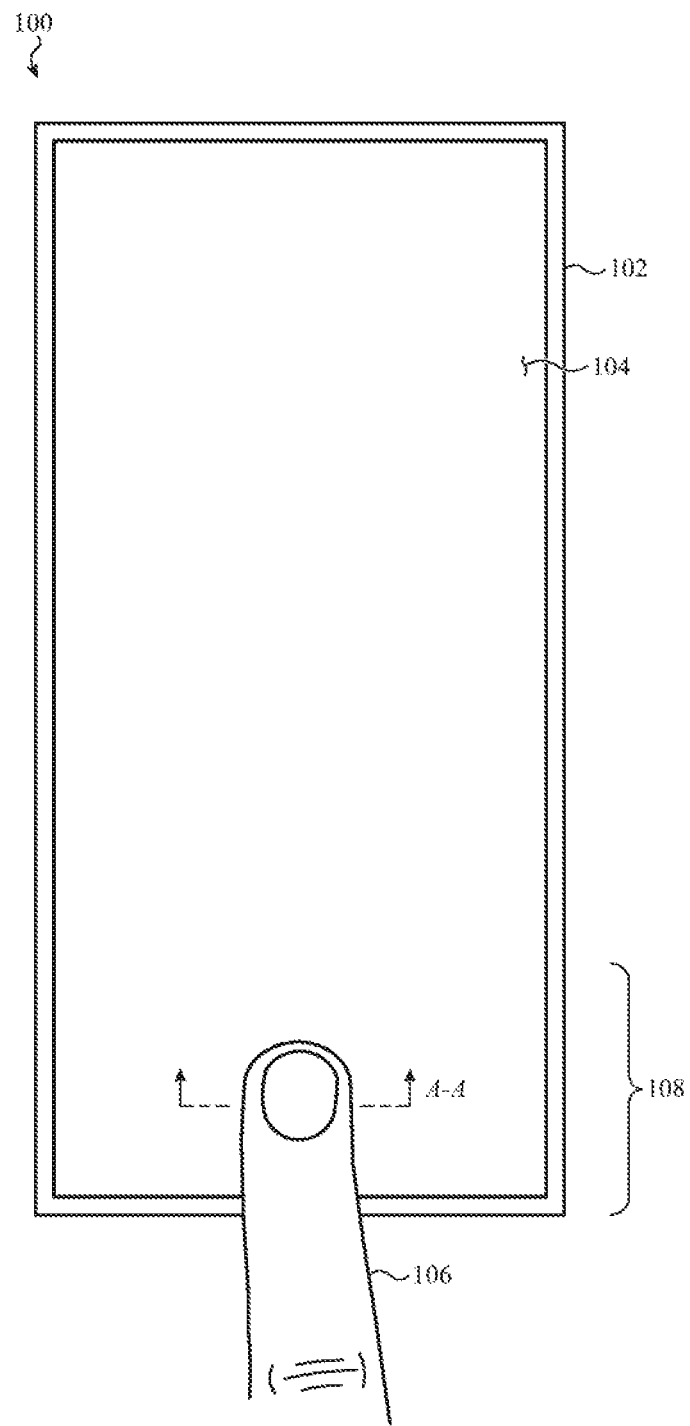
FIG. 1A depicts an electronic device that can incorporate a display stack suitable for through-display imaging.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Similarly, certain accompanying figures include vectors, rays, traces and/or other visual representations of one or more example paths—which may include reflections, refractions, diffractions, and so on, through one or more mediums—that may be taken by one or more photons originating from one or more light sources shown or, in some cases, omitted from, the accompanying figures. It is understood that these simplified visual representations of light are provided merely to facilitate an understanding of the various embodiments described herein and, accordingly, may not necessarily be presented or illustrated to scale or with angular precision or accuracy, and, as such, are not intended to indicate any preference or requirement for an illustrated embodiment to receive, emit, reflect, refract, focus, and/or diffract light at any particular illustrated angle, orientation, polarization, color, or direction, to the exclusion of other embodiments described or referenced herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference an electronic device that includes a display and an optical imaging system.

In certain embodiments, the optical imaging system is configured to operate in at least the shortwave infrared band and is positioned behind, and/or integrated within, the display of the electronic device. More specifically, the optical imaging system, when in operation, is configured to produce a flood illumination of an object or part of an object in contact with an input surface of the display in the shortwave infrared band. In addition, the optical imaging system is configured to receive and quantify surface and/or subsurface reflections—if any—that result from the flood illumination in the shortwave infrared band.

As used herein, the phrase "surface reflection" refers a change in polarity of at least one direction of propagation of an optical wavefront (e.g., a ray of light) as a result of interaction with an interface between two different media having differing refractive indices. A surface reflection can include both specular reflection components (e.g., components reflected at the same angle relative to a surface normal to the interface) and diffuse reflection components (e.g., components reflected at a different angle relative to the surface normal to the interface).

As used herein, the phrase "subsurface reflection" refers to one or more scattered or refracted components of an optical wavefront (e.g., a ray of light) passing through, or within, a non-transparent or translucent medium. A subsurface reflection, as described herein, includes predominantly diffuse reflection components.

As a result, when a user of the electronic device touches the input surface of the display (for example to interact with content shown on the display), the optical imaging system can obtain an image and/or otherwise determine one or more properties of that user's finger. For example, the optical imaging system can be configured to, without limitation: obtain an image of the user's fingerprint; determine a vein pattern of the user; determine blood oxygenation of the user; determine the user's pulse; determine whether the user is wearing a glove; determine whether the user's finger is wet or dry; and so on.

The optical imaging system can be any suitable optical imaging system, including both single-element sensors (e.g., photodiodes, phototransistors, photosensitive elements, and so on) and multi-element sensors (e.g., complementary metal oxide semiconductor arrays, photodiode arrays, and so on).

As noted above, in many embodiments, an optical imaging system, such as described herein, is configured to operate (e.g., to receive and/or emit light) in at least the shortwave infrared band. As used herein, the phrases "shortwave infrared band" and "shortwave infrared light" and similar phrases refer, generally, to the band of infrared light including wavelengths between and including approximately 1,100 nm (1.1 μm) to 3,000 nm (3.0 μm).

For example, in some embodiments, an optical imaging system can be configured to emit and/or receive light having wavelengths of approximately 1450 nm±50 nm. In other embodiments, an optical imaging system is configured to emit and/or receive light having wavelengths of approximately 1950 nm±50 nm. In still other embodiments, an optical imaging system is configured to emit and/or receive light having wavelengths of approximately 1200 nm±50 nm.

For simplicity of description, unless otherwise specified, it may be understood that an optical imaging system described herein is configured to emit and/or receive light having wavelengths of approximately 1450 nm±50 nm. It is appreciated, however, that this is merely one example and other wavelength bands—or multiple wavelength bands or different band widths—can be suitable in other implementations of the embodiments described herein, or equivalents thereof.

As noted above, an optical imaging system can be positioned behind a display of an electronic device defining an input surface. In these examples, the optical imaging system can be oriented to emit and receive light at least partially through the display toward and from the input surface. For example, in one embodiment, the optical imaging system is positioned below an organic light emitting diode display. In this example, the optical imaging system can emit and receive shortwave infrared light through inter-pixel regions of the organic light emitting diode display.

In another embodiment, a micro light emitting diode display can include an array of pixels defining an active display area below an input surface. An array of flood illumination pixels, each configured to emit light in at least the shortwave infrared band, can be dispersed among the pixels defining the active display area. In addition, an array of photosensitive elements, each responsive to light in at least the shortwave infrared band, can be dispersed among the pixels defining the active display area. In these embodiments, the array of flood illumination pixels can be used to illuminate an object in contact with the input surface and the array of photosensitive elements can be used to receive reflections from that object that result from the flood illumination.

In yet another embodiment, an organic light emitting diode display can include an array of pixels defining an active display area below an input surface. A backlight layer (which can be back-illuminated or side-illuminated), configured to emit light at least in the shortwave infrared band, can be positioned behind the active display area; light emitted from the backlight layer passes through inter-pixel regions of the organic light emitting diode display. In addition, an array of photosensitive elements, each responsive to light in at least the shortwave infrared band, can be formed onto the backlight, and separated from the backlight by an opaque masking layer. In these embodiments, the backlight can be used to illuminate an object in contact with the input surface and the array of photosensitive elements can be used to receive reflections from that object that result from the flood illumination.

In some embodiments, an optical imaging system such as described herein can be used by an electronic device for any suitable imaging, sensing, or data aggregation purpose without contributing to the size of a bezel region that may surround the display. Example uses include, but are not limited to: ambient light sensing; proximity sensing; depth sensing; receiving structured light; optical communication; proximity sensing; position-finding; biometric imaging (e.g., fingerprint imaging, iris imaging, facial recognition, vein imaging, and so on); determining optical, physical, or biometric properties (e.g., reflection spectrum, absorption spectrum, and so on); and the like.

In some embodiments, multiple discrete optical imaging systems can be associated with different regions of the same display. For example, a first optical imaging system can be disposed behind a lower portion of a display and a second optical imaging system can be disposed behind an upper portion of the same display. The first and second optical imaging systems can be configured to receive and/or emit light in the same or overlapping bands of shortwave infrared or traditionally visible light or, in other embodiments, in non-overlapping bands of shortwave infrared or traditionally visible light.

More generally, it may be appreciated that different discrete optical imaging systems associated with the same display can be configured for different purposes or in different ways. Similarly, a single optical imaging system can be configured to emit and/or receive light in multiple bands of light, either simultaneously, selectively, or in a particular sequence or pattern.

As such, for simplicity of description, many embodiments that follow reference an example construction in which a single optical imaging system is positioned at least partially behind an active display area of a display of an electronic device. It may be appreciated, however, that these embodiments described herein—together with equivalents thereof—may be altered or adjusted to incorporate discreet optical imaging systems in a variety of locations relative to a display or non-display surface of an electronic device and configured for the same or different imaging, sensing, or data aggregation purposes. For example, a first optical imaging system positioned relative to a first region of an active display area of a display of an electronic device may be configured to illuminate and obtain an image of a fingerprint of a user of that electronic device whereas a second optical imaging system positioned relative to a second region of the active display area may be configured to illuminate and obtain an image of a vein pattern of the user.

These foregoing and other embodiments are discussed below with reference to FIGS. 1A-6. However, those skilled in the art will readily appreciate that the detailed description given herein with respect to these figures is for explanatory purposes only and should not be construed as limiting.

FIG. 1A depicts an electronic device 100, including a housing 102 that encloses a display stack defining a display. The display stack can include layers or elements such as, in no particular order: a touch input layer; a force input layer; an anode layer; a cathode layer; an organic layer; an encapsulation layer; a reflector layer; a stiffening layer; an injection layer; a transport layer; a polarizer layer; an anti-reflective layer; a liquid crystal layer; a backlight layer; one or more adhesive layers; a compressible layer; an ink layer; a mask layer; and so on.

For simplicity of description, the embodiments that follow reference an organic light emitting diode display stack including, among other layers: a reflective backing layer; a thin-film transistor layer; an encapsulation layer; and an emitting layer. It is appreciated, however, that this is merely one illustrative example implementation and that other displays and display stacks can be implemented with other display technologies, or combinations thereof.

The display stack also typically includes an input sensor (such as a force input sensor and/or a touch input sensor) to detect one or more characteristics of a user's physical interaction with an active display area 104 of the display of the electronic device 100. The active display area 104 is typically characterized by an arrangement of individually-controllable, physically-separated, and addressable pixels or subpixels distributed at one or more pixel densities and in one or more pixel or subpixel distribution patterns.

Example input characteristics that can be detected by an input sensor of the electronic device 100 include, but are not limited to: touch location; force input location; touch gesture path, length, duration, and/or shape; force gesture path, length, duration, and/or shape; magnitude of force input; number of simultaneous force inputs; number of simultaneous touch inputs; and so on.

As a result of these constructions, a user 106 of the electronic device 100 may be encouraged to interact with content shown in the active display area 104 of the display by physically touching and/or applying a force with the user's finger to the input surface above an arbitrary or specific region of the active display area 104.

In these embodiments, as with other embodiments described herein, the display stack is additionally configured to facilitate through-display imaging of the user's fingerprint when the user 106 touches the display to interact with content shown in the active display area 104.

More specifically, in one example, the display stack defines an imaging aperture (not shown) through a backing layer of the display stack, thereby permitting light to travel through the display stack between two or more organic light emitting diode subpixels or pixels (herein, "inter-pixel" regions). In some cases, the imaging aperture takes a rectangular shape and is disposed on a lower region of the active display area 104, but this may not be required. In other cases, the imaging aperture takes a circular or oval shape and is disposed in a central region of the active display area 104. Typically, the imaging aperture is larger than the fingerprint of the user 106, but this may not be required and smaller apertures may be suitable. For example, in some embodiments, the backing layer may be omitted entirely; the imaging aperture may take the same size and shape as the active display area 104.

As noted with respect to other embodiments described herein, the electronic device 100 also includes an optical imaging system (not shown). The optical imaging system is positioned at least partially below the imaging aperture in order to collect and quantify light directed through the inter-pixel regions of the display stack. As a result of this construction, the electronic device 100 can obtain an image of the fingerprint of the user 106; this operation is referred to herein as a "fingerprint imaging operation."

In some embodiments, the optical imaging system of the electronic device 100 illuminates the finger of the user 106 during a fingerprint imaging operation with light in the shortwave infrared band at approximately 1450 nm±50 nm. Light in the shortwave infrared band may be selected to maximize absorption of light within the finger of the user 106, thereby minimizing or eliminating remittance reflections (e.g., light at least partially reflected and diffused by the subsurface layers of the user's skin) that may otherwise be received by the optical imaging system as noise. For example, it may be appreciated that water content in the skin of the user 106 may absorb a greater quantity of light at wavelengths approximately equal to 1200 nm, 1450 nm, and 1950 nm than other traditionally visible or traditionally non-visible frequencies. Accordingly, in many embodiments, while performing a fingerprint imaging operation, the optical imaging system of the electronic device 100 may be configured to operate at 1200 nm, 1450 nm, and/or 1950 nm.

In some embodiments, the optical imaging system of the electronic device 100 illuminates a region of the display below the finger of the user 106, as detected by the input sensor of the electronic device 100, with shortwave infrared light. In other examples, the optical imaging system illuminates a perimeter of the user's finger with shortwave infrared light. In some examples, the optical imaging system of the electronic device 100 illuminates discrete portions of the finger of the user 106 in sequence or in a particular pattern with shortwave infrared light at one or multiple frequencies or discrete bands.

In view of the preceding examples, it may be appreciated that illumination of the finger of the user 106 with shortwave infrared light during a fingerprint imaging operation can occur in a number of suitable ways. For example, in some cases, the optical imaging system of the electronic device 100 illuminates the user's finger with pulsed (continuous or discrete) or steady light in the shortwave infrared band. In other examples, the optical imaging system of the electronic device 100 illuminates the finger of the user 106 with shortwave infrared light emitted with a particular modulation pattern or frequency.

In further examples, the optical imaging system of the electronic device 100 illuminates the finger of the user 106 by alternating between frequencies or bands of light within the shortwave infrared band at a particular frequency, modulation, pulse pattern, waveform and so on.

In still other examples, the optical imaging system of the electronic device 100 illuminates the finger of the user 106 while the active display area 104 of the display of the electronic device 100 also renders a visible-light image. In other words, from the perspective of the user 106, the portion(s) of the display below the fingerprint may not be specially or differently illuminated from other portions of the display; the display can continue to render whichever static or animated image or series of images appeared on the display prior to the user touching the display. In still further examples, while the optical imaging system is performing a fingerprint imaging operation, the display of the electronic device 100 can locally increase or decrease brightness below the user's finger, can locally increase or decrease contrast below the user's finger, can locally increase or decrease saturation below the user's finger, and so on.

In other examples, the optical imaging system of the electronic device 100 need not illuminate the finger of the user 106 with only shortwave infrared light. For example, the optical imaging system may also be configured to illuminate the finger of the user 106 with green and/or blue visible light in order to detect or otherwise determine the user's pulse or blood oxygen content. In some cases, the optical imaging system is configured to perform a fingerprint imaging operation substantially simultaneously with an operation to detect the pulse of the user 106 to increase confidence that the fingerprint image obtained by the fingerprint imaging operation corresponds to a biological fingerprint.

Figure 1B:
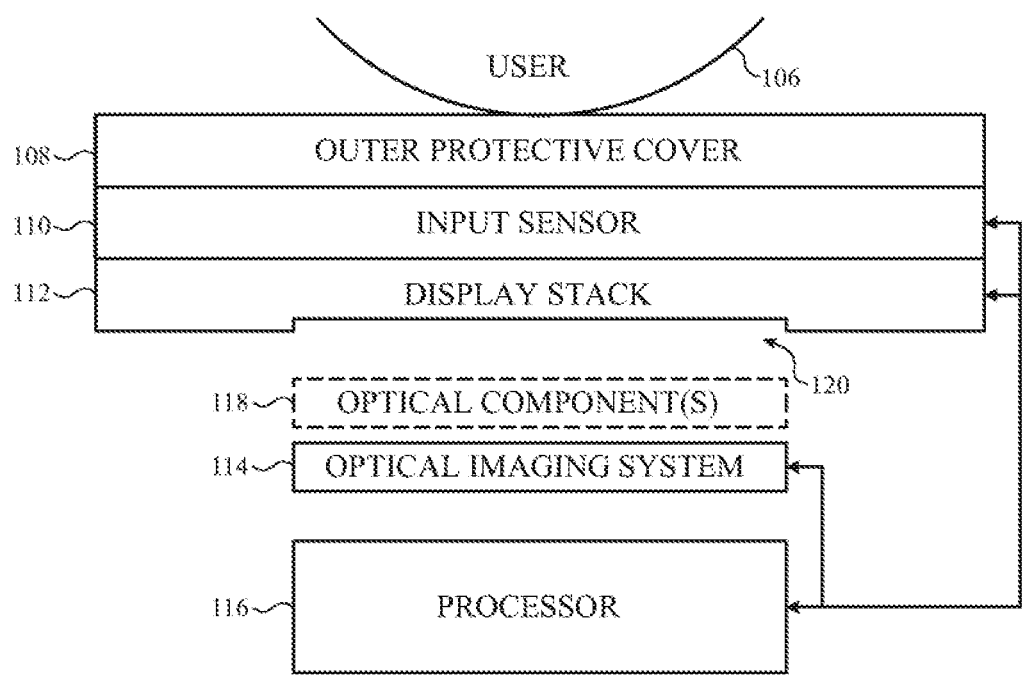
FIG. 1B depicts a simplified block diagram of the electronic device of FIG. 1A.

It may be appreciated that the foregoing description of FIG. 1A, and the various alternatives thereof and variations thereto, are presented, generally, for purposes of explanation, and to facilitate a thorough understanding of various possible configurations of an electronic device incorporating a display stack suitable for through-display imaging, such as described herein. However, it will be apparent to one skilled in the art that some of the specific details presented herein may not be required in order to practice a particular described embodiment, or an equivalent thereof. For simplicity of description and illustration, FIG. 1B is provided. This figure depicts a simplified block diagram of the electronic device of FIG. 1A showing various operational and structural components that can be included in an electronic device configured to through-display imaging such as described herein.

In particular, the electronic device 100 includes a protective outer cover 108. The protective outer cover 108 defines an input surface for the user 106 and, additionally, protects and encloses various components of the electronic device 100, including the optical imaging system, introduced and described in greater detail below. The protective outer cover 108 can be a single or multi-layer substrate made from any number of suitable materials, whether transparent, translucent, or opaque, including, but not limited to, glass, plastic, acrylic, polymer materials, organic materials, and so on. In many embodiments, the protective outer cover 108 is formed from a material transparent to shortwave infrared light, such as glass.

The electronic device 100 also includes an input sensor 110 disposed at least partially below the protective outer cover 108. The input sensor 110 can be any suitable input sensor including, but not limited to: a capacitive input sensor; a resistive input sensor; an inductive input sensor; an optical input sensor; and so on. The input sensor 110 can be configured to detect any suitable user input or combination of user inputs including, but not limited to: touch gestures; touch inputs; multi-touch inputs; force inputs; force gestures; multi-force inputs; pressure inputs; thermal inputs; acoustic inputs; and so on. In typical embodiments, the input sensor 110 is substantially transparent (e.g., exhibiting a transmittance of light greater than 80%), but this may not be required of all embodiments.

The electronic device 100 also includes a display stack 112 which can be disposed below the input sensor 110. The display stack 112 can be formed from a number of independent layers of material or materials that cooperate to define the display and the active display area 104 (see, e.g., FIG. 1A). In many examples, the display stack 112 defines an organic light emitting diode display, but this may not be required. For example, in other cases, the display stack 112 can define, without limitation: a micro light emitting diode display; a liquid crystal display; an electronic ink display; a quantum dot display; and so on.

As noted with respect to other embodiments described herein, the display stack 112 can define an array of discrete pixels that are independently addressable and controllable.

The pixels of the display stack 112 can be disposed at a constant pitch or a variable pitch to define a single pixel density or one or more pixel densities.

As noted with respect to other embodiments described herein, the active display area 104 of the display stack 112 is positioned at least partially above the optical imaging system, identified in the figure as the optical imaging system 114. As a result of this construction, the optical imaging system 114 can receive light transmitted through the inter-pixel regions of the active display area 104 of the display stack 112.

The optical imaging system 114 can include a number of light emitting and light detecting elements including one or more photosensitive elements arranged in any suitable pattern. In many examples, the optical imaging system 114 is a low fill-factor array of phototransistor or photodiode elements, disposed above or below or coplanar with the active display area 104 of the display, but this may not be required of all embodiments.

The optical imaging system 114, the display stack 112, and the input sensor 110—among other elements, modules, or components of the electronic device 100—are communicably coupled to a processor 116. The processor 116 can be any suitable processor or circuitry capable of performing, monitoring, or coordinating one or more processes or operations of the electronic device 100. The processor 116 can be any suitable single-core or multi-core processor capable to execute instructions stored in a memory (not shown) to instantiate one or more classes or objects configured to interface with an input or output of one or more of the optical imaging system 114, the display stack 112, and/or the input sensor 110. In some examples, the processor 116 may be a dedicated processor associated with one or more of the optical imaging system 114, the display stack 112, and/or the input sensor 110. In other cases, the processor 116 may be a general purpose processor.

In still other embodiments, the electronic device 100 can include one or more optional optical components 118. The optional optical components 118 are typically positioned between the optical imaging system 114 and the display stack 112 and can include, but may not be limited to: one or more lenses, filters, mirrors, actuators, apertures, irises, flash elements, narrow field of view filters, collimators, flood illuminators, or other accessory optical elements, or combinations thereof.

As noted above, the electronic device 100 can also include an imaging aperture 120 defined into or through one or more opaque or substantially opaque layers of the display stack 112. The imaging aperture 120 is typically aligned with the optical imaging system 114. As noted with respect to other embodiments described herein, the imaging aperture 120 can take any suitable size or shape.

Accordingly, generally and broadly in view of FIGS. 1A-1B, it is understood that an electronic device including a display suitable for through-display imaging can be configured in a number of ways. For example, although the electronic device 100 is depicted as a cellular phone, it may be appreciated that other electronic devices can incorporate a display stack such as described herein including, but not limited to: tablet devices; laptop devices; desktop computers; computing accessories; peripheral input devices; vehicle control devices; mobile entertainment devices; augmented reality devices; virtual reality devices; industrial control devices; digital wallet devices; home security devices; business security devices; wearable devices; health devices; implantable devices; clothing devices; fashion accessory devices; and so on.

Further it is appreciated that beyond the components depicted in FIGS. 1A-1B, the electronic device can also include one or more processors, memory, power supplies and/or batteries, network connections, sensors, input/output ports, acoustic elements, haptic elements, digital and/or analog circuits for performing, supervising, and/or coordinating one or more tasks of the electronic device 100, and so on. For simplicity of illustration, the electronic device 100 is depicted in FIGS. 1A-1B without many of these elements, each of which may be included, partially and/or entirely, within the housing 102 and may be operationally or functionally associated with, or coupled to, the display of the electronic device 100.

Further, although the electronic device 100 includes only a single rectangular display, it may be appreciated that this example is not exhaustive. In other embodiments, an electronic device can include, or may be communicably coupled to, multiple displays, one or more of which may be suitable for through-display imaging. Such accessory/auxiliary displays can include, but may not be limited to: secondary monitors; function row or keyboard key displays; wearable electronic device displays; peripheral input devices (e.g., trackpads, mice, keyboards, and so on) incorporating displays; digital wallet screens; and so on. Similarly, a rectangular display may not be required; other embodiments are implemented with displays taking other shapes, including three-dimensional shapes (e.g., curved displays).

Similarly, although the display described in reference to the electronic device 100 is a primary display of an electronic device, it is appreciated that this example is not exhaustive. In some embodiments, a display stack can define a low-resolution auxiliary display, such as a monochromatic display or a greyscale display. In other cases, a display stack can define a single-image display, such as a glyph or icon. In one specific example, a power button for an electronic device can include a button cap incorporating a display such as described herein. The display can be configured to selectively display a power icon and/or a limited set of icons or glyphs associated with one or more functions the button may be configured to perform, or one or more configurable options the button is associated with (e.g., power options, standby options, volume options, authentication options, digital purchase options, user authentication options, and so on). In these examples, a limited-purpose, auxiliary, or secondary display can be configured to have partial transparency or translucency, such as described herein, to facilitate through-display imaging.

Thus, it is understood that the foregoing descriptions of specific embodiments are presented for the purposes of illustration and description. These descriptions are not exhaustive nor intended to limit the disclosure to the precise forms recited herein. To the contrary, it will be apparent to one of ordinary skill in the art that many modifications and variations are possible in view of the above teachings. Particularly, it is understood that a display stack suitable for through-display imaging can be constructed and/or assembled in many suitable ways. For example, many embodiments described herein reference methods, constructions, and architectures that promote increased optical transmissivity through the display stack above an imaging aperture.

Figure 2A:
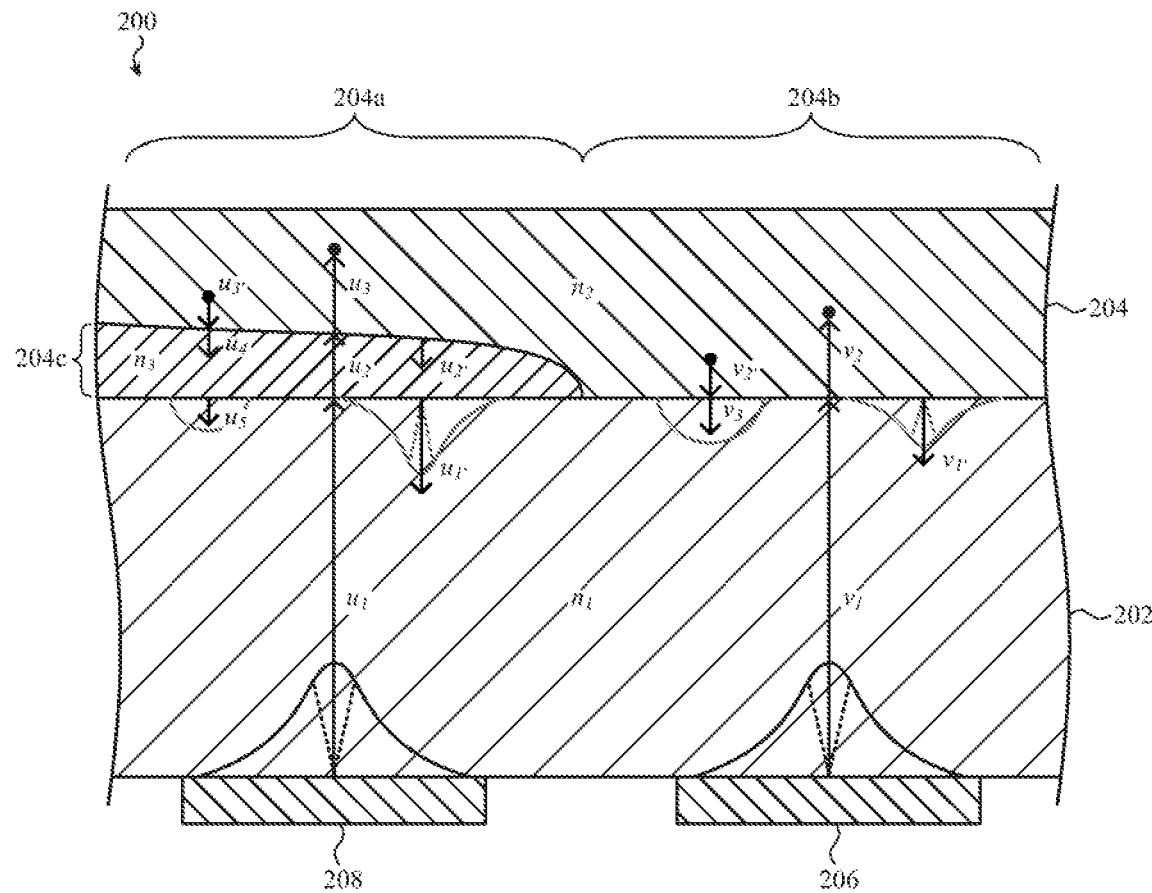
FIG. 2A depicts an example simplified cross-section of the display stack of FIG. 1A, taken through line A-A, depicting an optical imaging system operating outside the shortwave infrared band.
Figure 2B:
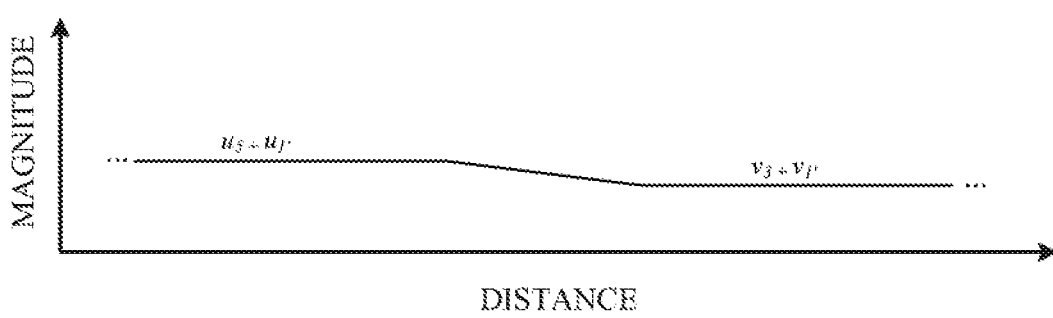
FIG. 2B is a chart depicting cumulative effects of surface and subsurface reflection(s) received by the optical imaging system of FIG. 2A.

Certain example implementations of an optical imaging system positioned below an input surface of a display stack of an electronic device are depicted in FIGS. 2A-2D. In particular, FIG. 2A depicts a simplified example cross-section of the display stack of FIG. 1A, touched by a user, taken through line A-A, depicting an optical imaging system positioned below the display stack.

More specifically, FIG. 2A depicts an optical imaging system 200 disposed at least partially behind a display stack 202 that defines a display (e.g., an organic light emitting diode display, a micro light emitting diode display, a liquid crystal display, and so on) to facilitate imaging of a fingerprint of a user 204 through the display stack 202.

For simplicity of illustration and description, the display stack 202 in the illustrated embodiment is simplified to a single layer, but it may be appreciated that the display stack 202 can include multiple discrete single or multi-function layers that can include, without limitation or specific requirement: a protective outer cover; an emitting layer (also referred to as a pixel layer); an opaque or reflective backing layer; a thin-film transistor layer; a capacitive touch sensing layer; a force sensing layer; a backlight layer; a polarizer layer; and so on.

A protective outer cover that may be included in the display stack 202 is typically formed from an optically transparent substrate material such as glass, acrylic, plastic, or the like. In many examples, a protective outer cover defines an input surface that can be touched by the user 204. In many examples, the protective outer cover defines at least a portion of an exterior surface of a housing of an electronic device, such as the housing 102 of the electronic device 100 depicted in FIG. 1A. In other words, for embodiments in which the display stack 202 is coupled to or otherwise includes a protective outer cover, the protective outer cover may at least partially enclose and/or seal one or more other layers of the display stack 202, such as an emitting layer or an opaque or reflective backing layer.

The optical imaging system 200 also includes one or more optical transducer modules, typically positioned at least partially below the display stack 202. The optical transducer modules may be configured to (1) emit light and (2) to receive light and can include one or more components such as, but not limited to: photodiodes; laser diodes; light emitting diodes; phototransistors; and so on. In the illustrated example, two optical transducer modules are shown and identified as the optical transducer module 206 and the optical transducer module 208.

The optical transducer modules 206, 208 of the optical imaging system 200 can be communicably coupled to a processor or a processing circuitry (not shown) via a circuit board. The circuit board can be formed from a rigid or flexible substrate. The processor or processing circuitry can be a general purpose processor or circuitry or an application-specific processor or circuitry configured for, in many examples, encrypted or otherwise secure data processing and/or storage.

As a result of the depicted construction, an image of the fingerprint of the user 204—and in particular, an image that distinguishes between ridge and valley features of the fingerprint—can be obtained by the optical imaging system 200 through the display stack 202. In the illustrated embodiment, a valley feature of the fingerprint of the user 204 is shown and identified as the valley feature 204a. Similarly, a ridge feature of the fingerprint of the user 204 is shown and identified as the ridge feature 204b. An air gap 204c separates the valley feature 204a from the display stack 202. It may be appreciated that the air gap 204c can also be occupied, in part or entirely by, without limitation, detritus, oils, gasses, liquids, and so on. For simplicity of illustration and description, the air gap 204c is depicted without such elements.

During a fingerprint imaging operation, the optical transducer modules 206, 208 can be separately, sequentially, or simultaneously illuminated (e.g., in response to a signal sent by a processor or processing circuitry) in a band outside the shortwave infrared wavelength band (with any suitable modulation, amplitude, color or spectrum, and so on) when the user 204 touches the protective outer cover.

Light emitted from the optical transducer modules 206, 208 is directed toward the fingerprint of the user 204 and, in turn, is reflected back into the display stack 202 by the various features of the user's fingerprint in contact with the outer layer (e.g., the input surface) of the display stack 202.

More particularly, in the illustrated example, light is emitted from the optical transducer module 208 into the display stack 202, at a selected frequency (more generally, in a narrow band of frequencies, represented in the figure with a normal distribution), and generally directed toward the valley feature 204a of the fingerprint of the user 204. The path of the light emitted from the optical transducer module 208 as it passes through the display stack 202 is represented by the ray $u_1$.

After passing through the display stack 202, the ray $u_1$ reaches an optical interface defined between the outer layer of the display stack 202 and the air gap 204c. As may be appreciated, the refractive indices of the display stack 202 (identified in FIG. 2A as $n_1$) and the air gap 204c (identified in FIG. 2A as $n_3$) may be mismatched and, as such, the ray $u_1$ may partially reflect from the interface and may partially traverse the interface. Reflection(s) from the interface defined between the outer layer of the display stack 202 and the air gap 204c are collectively represented in the figure by the ray $u_{1'}$. In addition, portions of the ray $u_1$ that traverse the interface are collectively represented in the figure by the ray $u_2$. In typical configurations and implementations, it may be appreciated that the ray $u_{1'}$ is primarily a surface reflection.

After passing through the air gap 204c, the ray $u_2$ reaches an optical interface defined between a portion of an outer layer of the valley feature 204a of the fingerprint of the user 204 and the air gap 204c. As may be appreciated, the refractive indices of the outer layer of the valley feature 204a (identified in FIG. 2A as $n_2$) and the air gap 204c (identified in FIG. 2A as $n_3$) may be mismatched and, as such, the ray $u_2$ may partially reflect from the interface and may partially traverse the interface. Reflection(s) from the interface defined between the outer layer of the valley feature 204a and the air gap 204c are collectively represented in the figure by the ray $u_2'$. In addition, portions of the ray $u_2$ that traverse the interface are collectively represented in the figure by the ray $u_3$. In typical configurations and implementations, it may be appreciated that the ray $u_{2'}$ can include both surface reflection components and subsurface reflection components.

After passing into the valley feature 204a of the fingerprint of the user 204, the ray $u_2$ may be diffused throughout the various layers of the skin of the user 204. This light is represented in the figure by the ray $u_3'$. In typical configurations and implementations, it may be appreciated that the ray $u_{3'}$ is primarily a subsurface reflection.

After diffusing and reflecting through various features within the valley feature 204a of the fingerprint of the user 204, a portion of the ray $u_{3'}$ can return to the optical interface defined between the outer layer of the valley feature 204a of the fingerprint of the user 204 and the air gap 204c. As noted above, because the refractive indices of the outer layer of the valley feature 204a (identified in FIG. 2A as $n_2$) and the air gap 204c (identified in FIG. 2A as $n_3$) may be mismatched, the ray $u_{3'}$ may partially reflect from the interface (returning into the valley feature 204a of the fingerprint of the user 204) and may partially traverse the interface into the air gap 204c. The portions of the ray $u_3$, that traverse the interface into the air gap 204c are collectively represented in the figure by the ray $u_4$. In typical configurations and implementations, it may be appreciated that the ray $u_4$, like the ray $u_3'$, includes primarily subsurface reflection components.

After passing through the air gap 204c, the ray $u_4$ returns to the optical interface defined between the outer layer of the display stack 202 and the air gap 204c. Once again, as noted above, because the refractive indices of the display stack 202 (identified in FIG. 2A as $n_1$) and the air gap 204c (identified in FIG. 2A as $n_3$) may be mismatched, the ray $u_4$ may partially reflect from the interface, returning toward the valley feature 204a of the fingerprint of the user 204, and may partially traverse the interface into the display stack 202. Portions of the ray $u_4$ that traverse the interface and return to the display stack 202 are collectively represented in the figure by the ray $u_5$. As with the ray $u_4$, in typical configurations and implementations, it may be appreciated that the ray $u_5$ includes primarily subsurface reflection components.

In addition, in the illustrated embodiment, light is emitted from the optical transducer module 206 into the display stack 202, at a selected frequency, and generally directed toward the ridge feature 204b of the fingerprint of the user 204. In this example, the path of the light emitted from the optical transducer module 206 as it passes through the display stack 202 is represented by the ray $v_1$.

After passing through the display stack 202, the ray $v_1$ reaches an optical interface defined between the outer layer of the display stack 202 and the ridge feature 204b of the fingerprint of the user 204. As may be appreciated, the refractive indices of the display stack 202 (identified in FIG. 2A as $n_1$) and the ridge feature 204b (identified in FIG. 2A as $n_2$) may be mismatched and, as such, the ray $v_1$ may partially reflect from the interface and may partially traverse the interface. Reflection(s) from the interface defined between the outer layer of the display stack 202 and the ridge feature 204b are collectively represented in the figure by the ray $v_1'$. In addition, portions of the ray $v_1$ that traverse the interface are collectively represented in the figure by the ray $v_2$. In typical configurations and implementations, it may be appreciated that the ray $v_1'$ is primarily a surface reflection.

After passing into the ridge feature 204b of the fingerprint of the user 204, the ray $v_2$ may be diffused throughout the various layers of the skin of the user 204. This light is represented in the figure as the ray $v_2'$. As may be appreciated, some of the light corresponding to ray $v_2'$ may exit the ridge feature 204b of the fingerprint of the user 204 and return to the display stack 202. This light is represented in the figure by the ray $v_3$. As with the ray $u_5$, in typical configurations and implementations, it may be appreciated that the ray $v_3$ includes primarily subsurface reflection components.

In this manner, when the optical transducer modules 206, 208 emit light toward the fingerprint of the user 204, both surface and subsurface reflections are reflected back which reduces the detectable contrast between the ridge and valley features of the fingerprint of the user 204. In particular, it may be appreciated that contrast is reduced in part because subsurface reflections and surface reflections often exhibit opposite polarity.

More specifically, as shown in FIG. 2A, subsurface reflections may be greater in magnitude for ridge regions of a fingerprint than for valley regions of the same fingerprint (see, e.g., the subsurface reflections represented by the rays $v_3$ and $u_5$). In other words, for subsurface reflections, ridges appear "brighter" than valley regions of a fingerprint. Oppositely, surface reflections may be greater in magnitude for valley regions of a fingerprint than for ridge regions of the same fingerprint (see, e.g., the surface reflections represented by the rays $u_1'$ and $v_1'$). In other words, for surface reflections, valleys appear "brighter" than ridges regions of a fingerprint. These opposite effects can result in substantially reduced contrast. For example, as shown in the chart depicted in FIG. 2B, both the valley feature 204a and the ridge feature 204b of the fingerprint of the user 204 are associated with a magnitude of reflected light that results from a combination of surface reflections and subsurface reflections. These combined reflections can undesirably reduce the performance (e.g., the detectable contrast between valleys and ridges) of the optical imaging system 200.

Figure 2C:
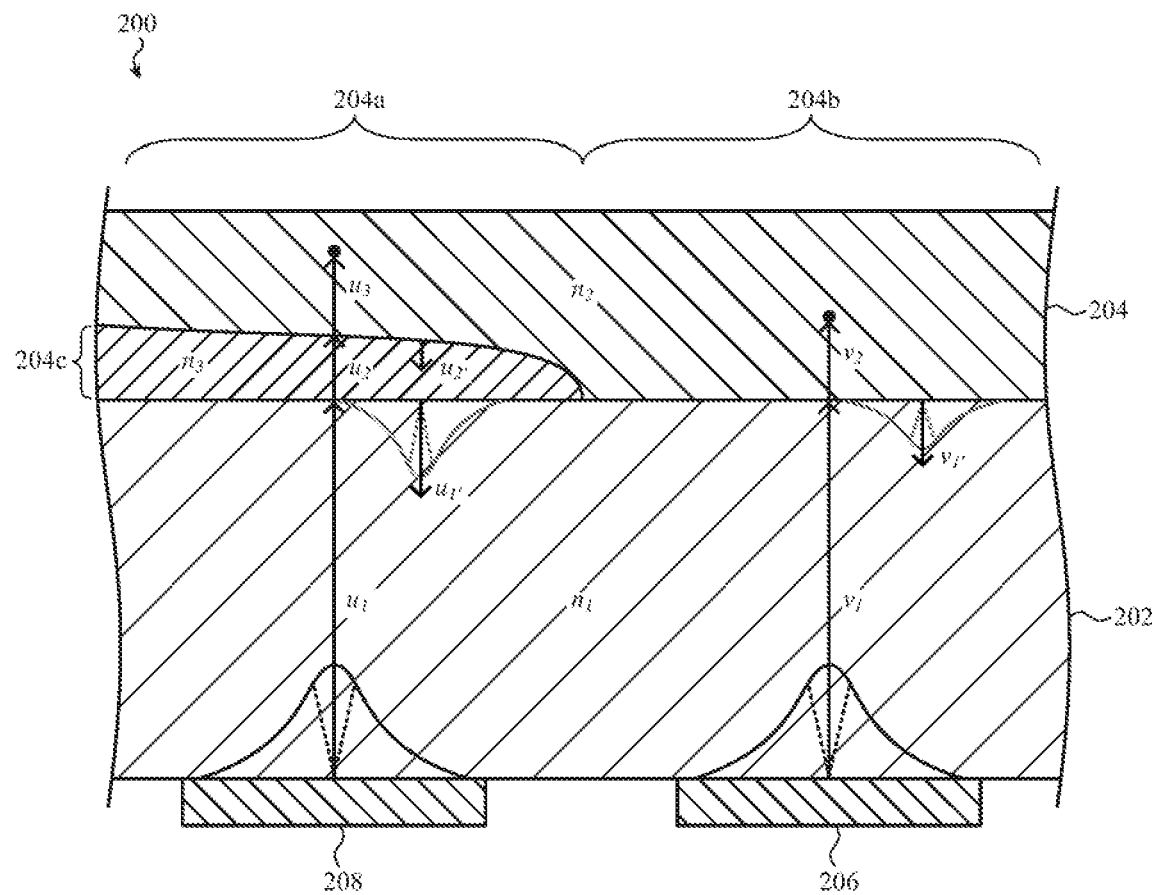
FIG. 2C depicts an example simplified cross-section of the display stack of FIG. 1A, taken through line A-A, depicting an optical imaging system operating within the shortwave infrared band.
Figure 2D:
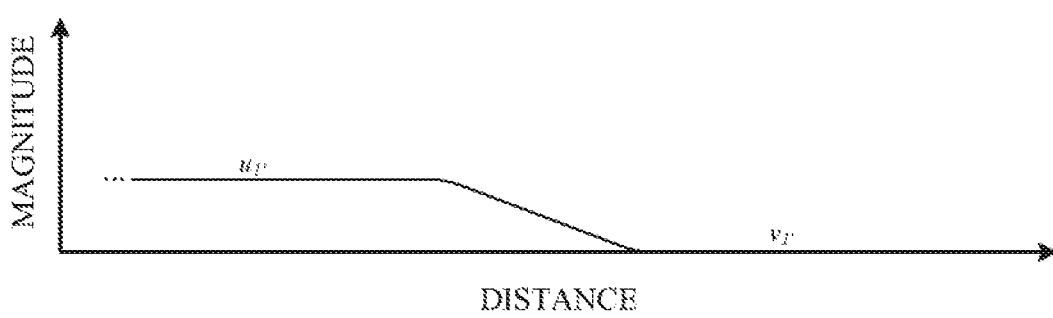
FIG. 2D is a chart depicting cumulative effects of surface and subsurface reflection(s) received by the optical imaging system of FIG. 2C.

Accordingly, many embodiments described herein operate an optical imaging system in the shortwave infrared band which, as noted above, includes wavelengths absorbed to a high degree by the water present in a user's finger. For example, FIG. 2C depicts an optical imaging system 200 disposed at least partially behind a display stack 202 that defines a display to facilitate imaging of a fingerprint of a user 204 through the display stack 202. The optical imaging system 200 can be configured in the same manner as described in reference to FIG. 2A; this description is not repeated.

In contrast to the embodiment depicted in FIG. 2A, during a fingerprint imaging operation, the optical transducer modules 206, 208 can be separately, sequentially, or simultaneously illuminated (e.g., in response to a signal sent by a processor or processing circuitry) in a shortwave infrared wavelength band that is absorbed to a high degree by water (e.g., 1450 nm±50 nm), when the user 204 touches the display stack 202.

In this example, light emitted from the optical transducer modules is directed toward the fingerprint of the user 204 which, in turn, is reflected back into the display stack 202 by the various features of the user's fingerprint in contact with the outer layer (e.g., the input surface) of the display stack 202. However, because of the selected wavelength of light, any light that traverses an optical interface boundary will be absorbed by the water in the finger of the user 204, effectively reducing and/or eliminating subsurface reflections.

More particularly, in the illustrated example, light is emitted from the optical transducer module 208 into the display stack 202, at a selected frequency, and generally directed toward the valley feature 204a of the fingerprint of the user 204. As with the embodiment depicted in FIG. 2A, the path of the light emitted from the optical transducer module 208 as it passes through the display stack 202 is represented by the ray $u_1$.

After passing through the display stack 202, the ray $u_1$ reaches an optical interface defined between the outer layer of the display stack 202 and the air gap 204c. As the refractive indices of the display stack 202 ($n_1$) and the air gap 204c ($n_3$) may be mismatched, the ray $u_1$ may partially reflect from the interface and may partially traverse the interface. As with the embodiment depicted in FIG. 2A, reflection(s) from this interface are collectively represented in the figure by the ray $u_1'$. In addition, portions of the ray $u_1$ that traverse the interface are collectively represented in the figure by the ray $u_2$. In typical configurations, as noted above, the ray $u_1'$ is primarily a surface reflection.

After passing through the air gap 204c, the ray $u_2$ reaches the optical interface defined between the outer layer of the valley feature 204a of the fingerprint of the user 204 and the air gap 204c. Because the refractive indices of the outer layer of the valley feature 204a ($n_2$) and the air gap 204c ($n_3$) can be mismatched, the ray $u_2$ may partially reflect from the interface and may partially traverse the interface. As with the embodiment depicted in FIG. 2A, reflection(s) from this interface are collectively represented in the figure by the ray $u_{2'}$ and portions of the ray $u_2$ that traverse the interface are collectively represented in the figure by the ray $u_3$. In typical configurations and implementations, it may be appreciated that the ray $u_{2'}$ can include both surface reflection components and subsurface reflection components.

In contrast to the embodiment described in reference to FIG. 2A, after passing into the valley feature 204a of the fingerprint of the user 204, the ray $u_2$ may be substantially absorbed by water in the various layers of the skin of the user 204.

As with the embodiment described in reference to FIG. 2A, light can also be emitted from the optical transducer module 206 into the display stack 202, at a selected frequency, and generally directed toward the ridge feature 204b of the fingerprint of the user 204. As with the embodiment described in reference to FIG. 2A, the path of the light emitted from the optical transducer module 206 as it passes through the display stack 202 is represented by the ray $v_1$.

As with previously described embodiments, after passing through the display stack 202, the ray $v_1$ reaches the optical interface defined between the outer layer of the display stack 202 and the ridge feature 204b of the fingerprint of the user 204. As noted above, the refractive indices of the display stack 202 ($n_1$) and the ridge feature 204b ($n_2$) may be mismatched and, as such, the ray $v_1$ may partially reflect from the interface and may partially traverse the interface. As with other embodiments described herein, reflection(s) from this interface are collectively represented in the figure by the ray $v_{1'}$ whereas portions of the ray $v_1$ that traverse the interface are collectively represented in the figure by the ray $v_2$. As noted above, the ray $v_{1'}$ is primarily a surface reflection.

After passing into the ridge feature 204b of the fingerprint of the user 204, the ray $v_2$ may be absorbed by the water within the various layers of the skin of the user 204.

In this manner, when the optical transducer modules 206, 208 emit shortwave infrared light toward the fingerprint of the user 204, substantially only surface reflections are reflected back which substantially increases the detectable contrast between the ridge and valley features of the fingerprint of the user 204. For example, as shown in the chart depicted in FIG. 2D, only the valley feature 204a of the fingerprint of the user 204 is associated with a certain magnitude of reflected light.

It may be appreciated that the foregoing description of FIGS. 2A-2D, and various alternatives thereof and variations thereto are presented, generally, for purposes of explanation, and to facilitate an understanding of various possible operational frequencies of optical imaging systems, such as described herein. However, it will be apparent to one skilled in the art that some of the specific details presented herein may not be required in order to practice a particular described embodiment, or an equivalent thereof.

Thus, it is understood that the foregoing descriptions of specific embodiments are presented for the purposes of illustration and description. These descriptions are not exhaustive nor intended to limit the disclosure to the precise forms recited herein. To the contrary, it will be apparent to one of ordinary skill in the art that many modifications and variations are possible in view of the above teachings. Particularly, it is understood that an optical imaging system can be formed in a display stack in a number of suitable ways.

Figure 3A:
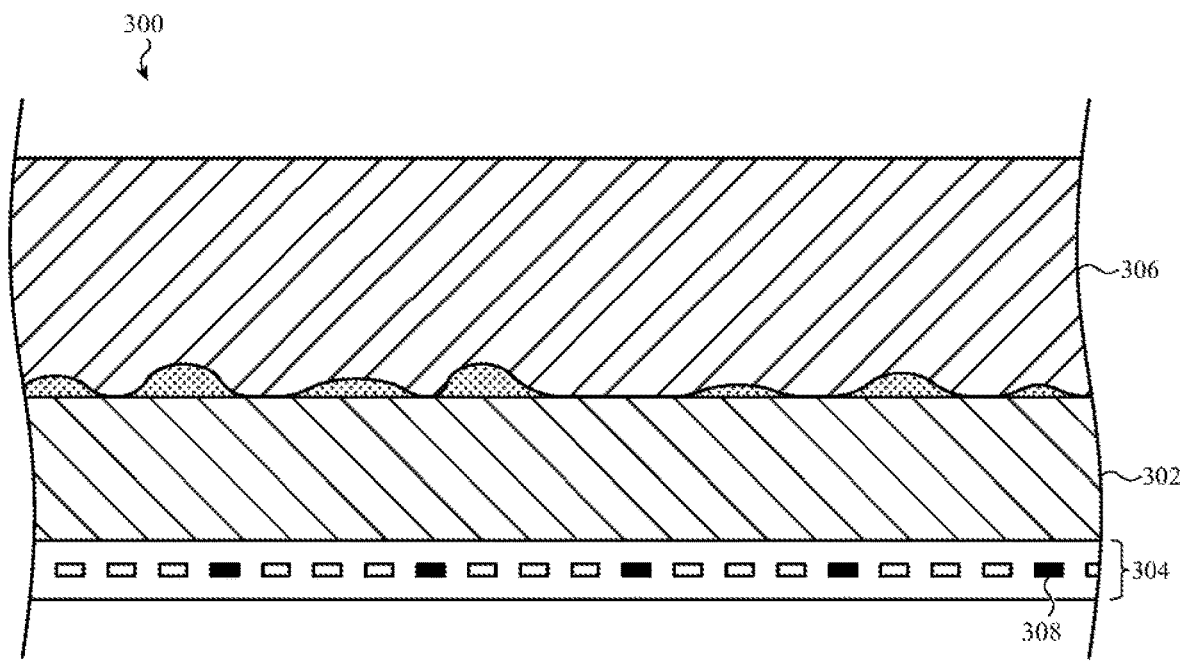
FIG. 3A depicts an example simplified cross-section of a display stack incorporating an optical imaging system, operable within the shortwave infrared band.

For example, FIG. 3A depicts an example simplified cross-section of a display stack incorporating at least a portion of an optical imaging system, operable within the shortwave infrared band, such as described herein. In this example, a display stack 300 includes an outer protective layer 302 that is positioned above a pixel layer 304. The outer protective layer 302 can be formed from any number of suitable transparent materials such as, but not limited to: glass, plastic, acrylic, sapphire, and so on.

It may be appreciated that the display stack 300 is presented in FIG. 3A in a simplified manner; as with the embodiments depicted in FIGS. 2A and 2C, it is appreciated that, for simplicity of illustration, various layers of the display stack 300 are omitted from the figure including, but not limited to: thin-film transistor layers; backlight layers; encapsulation layers; cathode layers; anode layers; color mask layers; polarizer layers; and so on.

The pixel layer 304 can be any suitable pixel layer including, but not limited to: an organic light emitting diode emitter layer; a micro light emitting diode layer; and so on. As with other embodiments described herein, the outer protective layer 302 not only protects the pixel layer 304 (and/or other layers within and/or required by a display stack) but the outer protective layer 302 may also define an input surface that may be touched by a user, such as the user 306.

In this embodiment, an optical imaging system can be partially integrated into the pixel layer 304 of the display stack 300. More particularly, an array of flood illumination pixels—one of which is identified as the flood illumination pixel 308—can be dispersed among the pixels of the pixel layer 304. Each flood illumination pixel 308 of the array of flood illumination pixels can be configured to emit light in one or more bands of light within the shortwave infrared band. For example, in one embodiment, a first subset of the array of flood illumination pixels may be configured to emit light at 1450 nm whereas a second subset of the array of flood illumination pixels may be configured to emit light at 1950 nm. In other cases, some of the flood illumination pixels of the array of flood illumination pixels can be configured to emit light in the near-infrared band or the visible band of light, but this may not be required of all embodiments.

In typical examples, the flood illumination pixels of the array of flood illumination pixels are simultaneously illuminated during a fingerprint imaging operation, but this may not be required. For example, in some cases, each flood illumination pixel may be individually addressable and/or controllable. In these and related examples, the array of flood illumination pixels can be coupled to a display controller (not shown) that is also configured to drive the various pixels of the pixel layer 304. In other cases, the array of flood illumination pixels can be coupled to a dedicated controller, separate from the display controller.

Figure 3B:
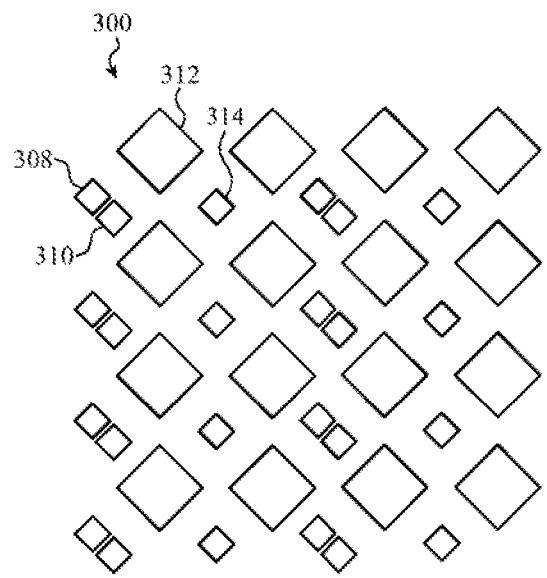
FIG. 3B depicts an example arrangement of pixels of a display stack incorporating an optical imaging system operable within the shortwave infrared band.

The array of flood illumination pixels can be dispersed in any suitable pattern or configuration among the pixels of the pixel layer 304. For example, FIG. 3B depicts an example arrangement of pixels of the display stack 300. In this example, the flood illumination pixel 308 can be positioned adjacent to, and coplanar with, a red subpixel 310, a blue subpixel 312, and a green subpixel 314.

Although the array of flood illumination pixels, including the flood illumination pixel 308, generally take the shape of a square in the illustrated embodiment, it may be appreciated that this is merely one example embodiment. Other shapes, layouts, and configurations are possible.

Figure 4A:
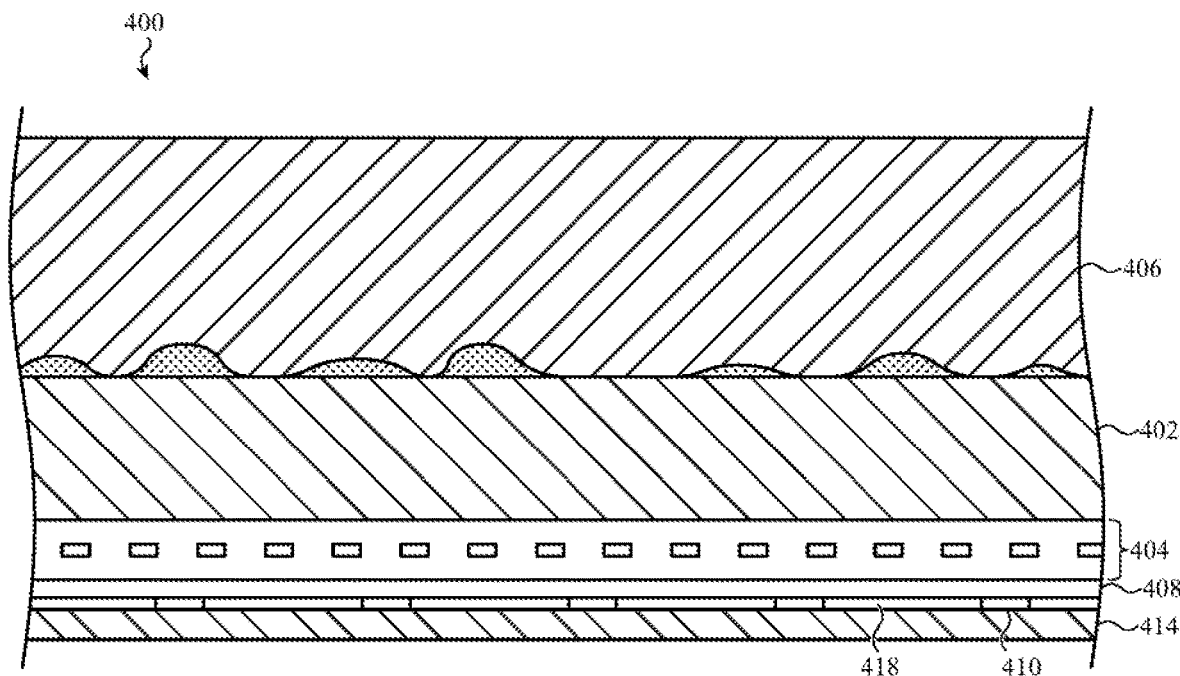
FIG. 4A depicts an example simplified cross-section of a display stack incorporating an optical imaging system, operable within the shortwave infrared band.
Figure 4B:
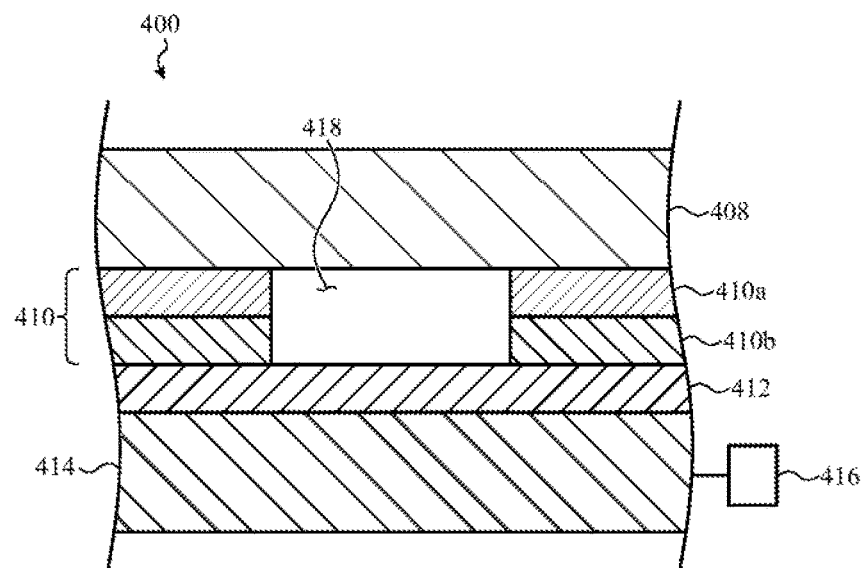
FIG. 4B is a detail view of a portion of the optical imaging system of FIG. 4A.

FIG. 4A depicts an example simplified cross-section of another optical imaging system, operable within the shortwave infrared band, that can be incorporated into and/or positioned behind a display stack. FIG. 4B depicts a detail view of a portion of the optical imaging system of FIG. 4A. In this example, a display stack 400 includes a protective outer cover 402 positioned above a pixel layer 404 (that selectively or entirely omits any opaque backing layer or reflective backing layer). The protective outer cover 402 defines an input surface that can be touched by a user 406. The display stack 400, the protective outer cover 402, and the pixel layer 404 can, in many cases, be configured in a similar manner to the embodiments described above in reference to FIGS. 2A, 2C, and FIG. 3A; this description is not repeated.

In this example embodiment, the optical imaging system can be positioned behind the pixel layer 404 of the display stack 400. As illustrated, the optical imaging system includes a narrow field of view filter 408, a photodetector stack 410, a thin-film transistor layer 412, a floodlight waveguide 414, a light emitting element 416, and a floodlight aperture 418.

As with other embodiments described herein, the optical imaging system depicted in FIGS. 4A-4B is configured to both emit light and to detect light, specifically in the shortwave infrared band. In the illustrated embodiment, the optical imaging system is positioned behind the pixel layer 404 and, due at least in part to the fact that the pixel layer 404 omits an opaque backing, can both receive and transmit light through the inter-pixel regions of the pixel layer 404.

More specifically, in order to emit light, the optical imaging system of this embodiment includes a floodlight waveguide 414 positioned behind a floodlight aperture 418 that, in turn, is generally vertically aligned with at least one inter-pixel region of the pixel layer 404 of the display stack 400. A light emitting element 416 is optically coupled to the floodlight waveguide 414, and may be physically positioned along a periphery of the floodlight waveguide 414 (e.g., a side-firing configuration). As a result of this construction, light emitted from the light emitting element 416 can be guided toward, and emitted from, the floodlight aperture 418 by the floodlight waveguide 414. Further, due to the relative positioning of the floodlight aperture 418 and the at least one inter-pixel region of the pixel layer 404 of the display stack 400, light emitted through the floodlight aperture 418 can be transmitted through the pixel layer 404, and, thereafter, through the protective outer cover 402. In this manner, the optical imaging system is configured to emit light toward the user 406 to illuminate the fingerprint of the user 406.

In addition, in order to detect light, the optical imaging system includes a photodetector stack 410 positioned below the narrow field of view filter 408 and disposed on a thin-film transistor layer 412 that is, in turn, coupled to and positioned above the floodlight waveguide 414. As used herein, the phrase "narrow field of view" refers to an optical filter or element configured to transmit light directed on a path substantially normal to (e.g., within 20-30 degrees, in some examples, of normal) the optical filter and configured to reject light (e.g., block light) directed on other paths.

The photodetector stack 410 includes a photosensitive element 410a and an opaque mask layer 410b. The opaque mask layer 410b is formed from an optically opaque material so as to optically isolate the photosensitive element 410a from the floodlight waveguide 414. In many cases, the opaque mask layer 410b is formed or otherwise disposed onto the thin-film transistor layer 412 and/or the floodlight waveguide 414.

As a result of this construction, in order to perform a fingerprint imaging operation, the optical imaging system drives the light emitting element 416 in order to generate a flood illumination, through the pixel layer 404 and the protective outer cover 402, of the fingerprint of the user 406 with shortwave infrared light. As described above in reference to FIGS. 2B-2C, one or more surface reflections, corresponding to valley features of the fingerprint of the user 406 are thereafter reflected downwardly through the protective outer cover 402. A percentage of the reflected rays may traverse the pixel layer 404 through one or more inter-pixel regions. Thereafter, surface reflections of the fingerprint of the user 406 that are directed substantially normal to the narrow field of view filter 408 pass through the filter and illuminate the photosensitive element 410a that, in response, can generate or otherwise cause a change in an electrical signal. Thereafter, the thin-film transistor layer 412 can convey one or more electrical signals obtained from the photosensitive elements of the optical imaging system to a processor or circuit for processing.

It may be appreciated that the foregoing description of FIGS. 3A-4B, and various alternatives thereof and variations thereto, are presented, generally, for purposes of explanation, and to facilitate an understanding of various possible configurations and constructions of an optical imaging system, such as described herein. However, it will be apparent to one skilled in the art that some of the specific details presented herein may not be required in order to practice a particular described embodiment, or an equivalent thereof.

Thus, it is understood that the foregoing descriptions of specific embodiments are presented for the purposes of illustration and description. These descriptions are not exhaustive nor intended to limit the disclosure to the precise forms recited herein. To the contrary, it will be apparent to one of ordinary skill in the art that many modifications and variations are possible in view of the above teachings. Particularly, it is understood that an optical imaging system can be formed in a display stack in a number of suitable ways.

For example, it may be appreciated that the examples shown in FIGS. 3A-4B are not exhaustive. In other cases, an optical imaging system can be constructed in a different manner. For example, in some embodiments, a floodlight waveguide may not be required; an optical imaging sensor can be illuminated with backside illumination. In other cases, a combination of backside and side-firing illumination may be implemented. In still further embodiments, as noted above, more than one light emitting element—each configured to emit light at a different frequency—can be optically coupled to a floodlight waveguide, such as described herein. In these embodiments, each light emitting element can be associated with a particular spectrum or bandwidth suitable for a particular type or technique of optical imaging. For example, it may be appreciated that vein imaging may be efficiently performed at a different illumination wavelength than fingerprint sensing. Further, it may be appreciated that different wavelengths of light may be more appropriate to image wet fingers, dry fingers, or gloved fingers. As such, multiple discrete flood illumination light emitting elements may be preferable in certain embodiments.

Further, it may be appreciated that an optical imaging system such as described herein may typically dispose light emitting and/or light detecting elements or pixels in a rectangular and/or array pattern, although this is not required of all embodiments. For example, in some cases, a circular deposition or distribution of light emitting and/or light detecting elements of an optical imaging system such as described herein may be more suitable.

Figure 5:
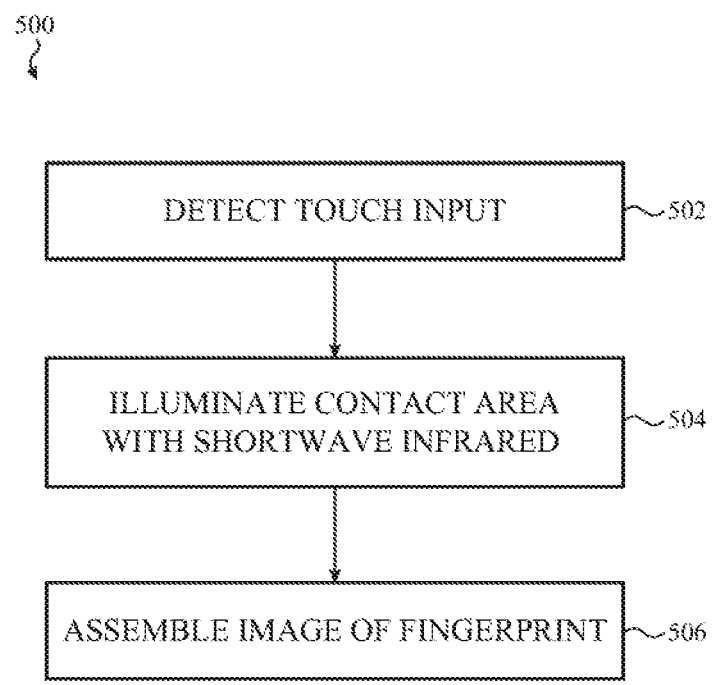
FIG. 5 is a simplified flow chart depicting example operations of a method of capturing an image of an object touching a display, such as described herein.
Figure 6:
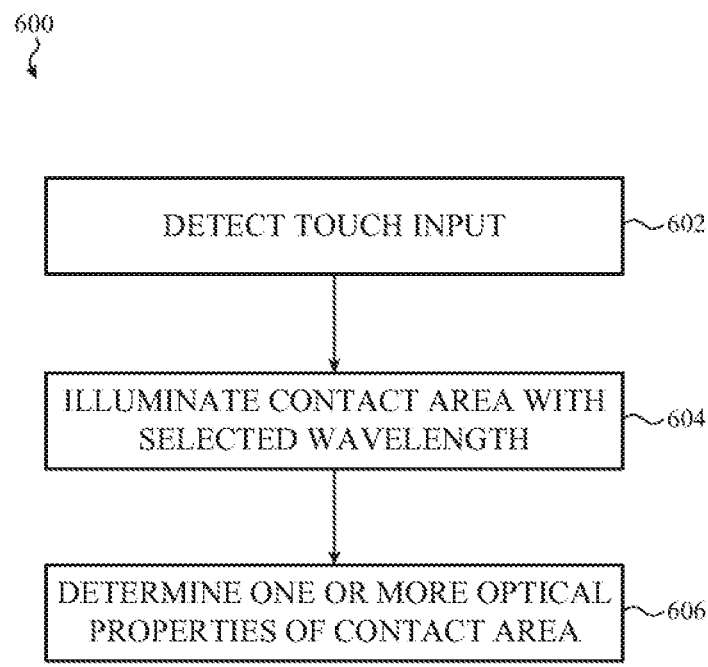
FIG. 6 is a simplified flow chart depicting example operations of a method of determining an optical property of an object touching a display, such as described herein.

Generally and broadly, FIGS. 5 and 6 depict simplified flow charts corresponding to various ordered and/or unordered operations of methods described herein. It may be appreciated that these simplified examples may be modified in a variety of ways. In some examples, additional, alternative, or fewer operations than those depicted and described may be possible.

FIG. 5 is a simplified flow chart depicting example operations of a method of capturing an image of an object touching a display, such as described herein. The method can be performed, in whole or in part, by a processor or circuitry of an electronic device such as described herein (see, e.g., FIGS. 1A, 2A-4B, and so on).

The method 500 includes operation 502 in which a touch to a display of an electronic device is detected. The initial touch can be detected using any suitable sensor or combination of sensors including but not limited to touch sensors and force sensors. Example touch sensors include, but are not limited to: capacitive touch sensors; optical touch sensors; resistive touch sensors; acoustic touch sensors; and so on. Example force sensors include, but are not limited to: capacitive force sensors; resistive force sensors; piezoelectric force sensors; strain-based force sensors; inductive force sensors; and so on.

Once a touch is detected at operation 502, the method 500 continues to operation 504, in which a contact area of the detected touch is illuminated with shortwave infrared light. As noted with respect to other embodiments described herein, the illumination of the contact centroid and/or contact area can be performed in any suitable manner including, but not limited to: a specific/selected modulation of light; a specific/selected pattern (e.g., linear sweep, radial sweep, radial expansion, and so on); and so on or any combination thereof.

The method 500 also includes operation 506 in which a fingerprint image is captured by the optical imaging system of the electronic device. As noted with respect to other embodiments described herein, the operation of capturing an image of a fingerprint (or, more generally, an image of an object in contact with the display at operation 502) can include one or more filtering operations such as: spatial filtering (e.g., point-source filtering, beam-forming, and so on); thresholding; deskewing; rotating; and so on.

FIG. 6 is a simplified flow chart depicting example operations of a method of capturing an image of an object touching a display, such as described herein. The method can be performed, in whole or in part, by a processor or circuitry of an electronic device such as described herein (see, e.g., FIGS. 1A, 2A-4B, and so on). The method 600 beings at operation 602 in which a touch input is detected. Thereafter, at operation 604, the contact area of the touch input is illuminated with a selected wavelength, such as 1450 nm or 1950 nm, or any suitable shortwave infrared wavelength. Finally, at operation 606, one or more optical properties of the contact area can be determined, including, but not limited to: light absorption; light reflection; blood oxygenation; pulse rate; respiration rate; hydration; and so on.

One may appreciate that although many embodiments are disclosed above, that the operations and steps presented with respect to methods and techniques described herein are meant as exemplary and accordingly are not exhaustive. One may further appreciate that alternate step order or, fewer or additional operations, may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

Further, the present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers, touch gestures, or other authentication methods, alone or in combination, known to those of skill in the art. In another example, users can select to remove, disable, or restrict access to certain health-related applications collecting users' personal health or fitness data.

What is claimed is:

1. An electronic device comprising:
a cover defining an input surface;

a display positioned below and adhered to the cover; and
a biometric system below the display and comprising:
an infrared light emitting element configured to emit shortwave infrared light toward the input surface;
a light sensitive element configured to receive, through the display, a reflection of light emitted by the infrared light emitting element from a body engaging the display; and
a processing circuit configured to:
monitor output of the light sensitive element to determine one or more optical properties of the body; and
provide an output corresponding to a biometric property of the body, the output based at least in part on the one or more optical properties of the body.

2. The electronic device of claim 1, wherein the biometric property comprises at least one of:
a pulse rate;
a respiration rate; or
hydration.

3. The electronic device of claim 1, wherein the electronic device is a wearable electronic device and the body is a wrist of a user.

4. The electronic device of claim 1, wherein the electronic device is a wearable electronic device and the body comprises skin of the user.

5. The electronic device of claim 1, wherein the light sensitive element is optically isolated from the infrared light emitting element.

6. The electronic device of claim 1, wherein the infrared light emitting element is configured to emit shortwave infrared light at a wavelength between 1400 nm and 1500 nm.

7. The electronic device of claim 1, wherein the light sensitive element is disposed on, and formed with, a thin-film transistor layer of the display.

8. The electronic device of claim 1, further comprising a waveguide positioned below the display and optically coupled to the infrared light emitting element.

9. The electronic device of claim 8, wherein the infrared light emitting element is disposed along an edge of the waveguide.

10. The electronic device of claim 8, wherein the waveguide is positioned to emit light between pixels of the display.

11. A method of operating a biometric sensing system positioned below a display of an electronic device, the method comprising:
detecting, by a touch input sensor of the electronic device, a contact with the display by a body part of the user;
illuminating the body part with at least one infrared light emitting element of the biometric imaging system;
receiving one or more reflections of infrared light from the body part; and
determining a biometric property of the body part or the user based at least in part on the received one or more reflections, the biometric property comprising at least one of a respiration rate or a pulse rate.

12. The method of claim 11, wherein the operation of illuminating the contact region comprises emitting shortwave infrared light at least partially through interpixel regions of the display.

13. The method of claim 11, further comprising filtering the one or more received surface reflections through a narrow field of view filter.

14. The method of claim 11, wherein the operation of illuminating the contact region comprises emitting shortwave infrared light into a waveguide defined through the display.

15. A method of determining a biometric characteristic of a body part in contact with a transparent input surface, the method comprising:
illuminating a substrate defining the transparent input surface with shortwave infrared light;
receiving one or more surface shortwave infrared light reflections from the input surface at an array of light sensitive elements; and
determining an optical property of the body part based on the one or more surface shortwave infrared light reflections;
monitoring changes in the optical property over a time period; and
determining the biometric characteristic based on changes in the optical property over the time period.

16. The method of claim 15, wherein the shortwave infrared light has a wavelength greater than 1400 nm.

17. The method of claim 15, wherein the shortwave infrared light has a wavelength greater than 1900 nm.

18. The method of claim 15, wherein the received shortwave infrared light reflections are filtered by a narrow field of view filter extending at least partially below the transparent input surface.

19. The method of claim 15, wherein the biometric characteristic comprises a pulse rate.

20. The method of claim 15, wherein the biometric characteristic comprises at least one image of a fingerprint of a user touching the transparent input surface.

* * * * *